US010348096B2

(12) United States Patent
Huomo

(10) Patent No.: US 10,348,096 B2
(45) Date of Patent: Jul. 9, 2019

(54) FREQUENCY RESPONSE

(71) Applicant: Reactive Technologies Limited, Oxford (GB)

(72) Inventor: Heikki Huomo, Oulu (FI)

(73) Assignee: Reactive Technologies Limited, Oxford (GB)

( * ) Notice: Subject to any disclaimer, the term of this patent is extended or adjusted under 35 U.S.C. 154(b) by 193 days.

(21) Appl. No.: 15/291,969

(22) Filed: Oct. 12, 2016

(65) Prior Publication Data
US 2017/0098937 A1 Apr. 6, 2017

Related U.S. Application Data

(63) Continuation of application No. PCT/EP2015/056665, filed on Mar. 26, 2015.

(30) Foreign Application Priority Data

Apr. 15, 2014 (GB) .................................. 1406791.2

(51) Int. Cl.
*H02J 3/38* (2006.01)
*H02J 3/14* (2006.01)
(Continued)

(52) U.S. Cl.
CPC ............... *H02J 3/386* (2013.01); *H02J 3/14* (2013.01); *H02J 3/38* (2013.01); *H02J 3/383* (2013.01);
(Continued)

(58) Field of Classification Search
CPC ...... H02J 3/386; H02J 3/14; H02J 3/00; H02J 3/38; H02J 13/00
(Continued)

(56) References Cited

U.S. PATENT DOCUMENTS

2010/0072817 A1 3/2010 Hirst
2010/0100250 A1 4/2010 Budhraja et al.
(Continued)

FOREIGN PATENT DOCUMENTS

EP 1467463 A1 10/2004
EP 1914420 A1 * 4/2008 ........... F03D 7/0272
(Continued)

OTHER PUBLICATIONS

Kontogiannis C C et al: "An Efficient Power Management and Control in Wind Parks by Means of a Radio Teleetry Control System", Electromotion, Mediamira, Cluj-Napoca, RO, Jun. 19, 2011 (Jun. 19, 2001), pp. 461-465 XP001154444, ISSN: 1223-057X.
(Continued)

*Primary Examiner* — Rexford N Barnie
*Assistant Examiner* — Joseph N Inge
(74) *Attorney, Agent, or Firm* — EIP US LLP

(57) ABSTRACT

Control systems and methods for control of grid frequency in an electric power grid, are described. A grid frequency is monitored by monitoring devices at one or more predefined locations in the grid, and a determination is made whether one or more conditions relating to the monitored frequency have been met. A control period during which the grid frequency at one or more of the one or more predefined locations is to be controlled is initiated based on the determination. One or more variation characterizes relating to a variation, during the control period, in grid frequency are determined. Control instructions, comprising instructions to control power flow to and/or from each of a first plurality of power units, are sent. The control instructions are generated on the basis of profile information relating to the power units and the determined one or more variation characteristics.

29 Claims, 8 Drawing Sheets

(51) Int. Cl.
*H02J 3/46* (2006.01)
*H02J 13/00* (2006.01)

(52) U.S. Cl.
CPC ............ *H02J 3/46* (2013.01); *H02J 13/0093* (2013.01); *H02J 3/381* (2013.01); *Y02B 70/3225* (2013.01); *Y02E 10/763* (2013.01); *Y02P 80/22* (2015.11); *Y04S 20/222* (2013.01)

(58) Field of Classification Search
USPC ........................................................ 307/29
See application file for complete search history.

(56) References Cited

U.S. PATENT DOCUMENTS

| | | |
|---|---|---|
| 2010/0219808 A1 | 9/2010 | Steckley et al. |
| 2011/0166717 A1 | 7/2011 | Yasugi |
| 2014/0070617 A1* | 3/2014 | Detmers ................. H02J 7/041 307/64 |

FOREIGN PATENT DOCUMENTS

| | | |
|---|---|---|
| EP | 2072813 A2 | 6/2009 |
| EP | 2557647 A2 | 2/2013 |
| EP | 1381132 A1 | 1/2014 |
| GB | 2482426 A | 2/2012 |
| JP | 2013153648 A | 8/2013 |
| TW | 201325004 A | 6/2013 |
| WO | 2013010266 A1 | 1/2013 |

OTHER PUBLICATIONS

European Examination Report dated Apr. 3, 2018 for Application No. 15716449.2.
Japanese Rejection Notice dated Jul. 31, 2018 for Japanese Application No. 2016562014.
Taiwan Search Report dated Aug. 7, 2018 for Application No. 104112111.
Chinese Search Report dated Jul. 31, 2018 for Application No. 201580031893.9.
European Examination Report dated Mar. 21, 2019 for Application No. 15716449.2.

* cited by examiner

FREQUENCY RESPONSE

CROSS-REFERENCE TO RELATED APPLICATIONS

This application is a continuation of International Application No. PCT/EP2015/056665, filed Mar. 26, 2015, which claims the benefit of GB Application No. GB1406791.2, filed Apr. 15, 2014. Each of the above-referenced patent applications is incorporated by reference in its entirety.

BACKGROUND OF THE INVENTION

Field of the Invention

The present invention relates to the control of grid frequency in an electric power grid.

Description of the Related Technology

Since the standardization of the frequency of alternating current (AC) electricity in large scale electric power grids in the mid-20th century around the globe, consumers of electricity have been able to enjoy a consistent and dependable service of electricity, ensuring safe and reproducible use of electrical appliances. For example, in the UK, the standardized nominal grid frequency is set at 50 Hz. To promote the reliability of the grid frequency, grid operators provide ranges of frequency around the nominal grid frequency outside which they may ensure service providers or consumers the grid frequency will not stray. For example, using the nominal UK grid frequency of 50 Hz, the grid operator may aim that the grid frequency should not go outside the range 50±0.5 Hz (or ±1% of the nominal frequency).

The grid frequency depends strongly on the frequency of electricity produced by generators of electrical power attached to the grid. Large capacity generators may, for example, consist of a driven mass incorporating magnetic poles rotating inside a wire coil. This mass may be driven, for example, by steam acting on a turbine, where the steam is produced, for example, by the burning of fossil fuels. Taking into account the number of poles associated with a generator, the frequency of electricity produced is proportional to the rotation speed of the generator. For example, a generator with 6 poles rotating at 1000 RPM would produce electricity with a frequency of 50 Hz. In other examples of power generation, for example those which generate direct current (DC) electricity, such as solar panels, inverters may be employed to provide AC electricity at a certain frequency, for example the nominal grid frequency, to the grid.

In a grid where the provision and consumption of electrical power is balanced, the rotation speed of the generators, for example, can be set so as to effect, precisely, a grid frequency at the nominal grid frequency. However, if there is a change in the power balance, for example a sudden increase in demand, the rotational speed of a generator responding to that change, for a given drive of the turbine for example, may reduce. As a result, the frequency of the generated electricity may reduce, and hence the grid frequency may reduce. This situation may be rectified by applying a greater drive to the turbine of the generator, but this may take considerable time, or, in the case a generator is working at full capacity, may not be possible. A sudden power imbalance may also arise, for example, when a power station, or interconnector is suddenly lost from the grid. In the case of a sudden reduced demand of power, a generator may reduce its power output in order to return the grid frequency to the nominal frequency accordingly. Equally as a result of a decrease in demand, or for example, if an interconnector is exporting power from the grid when it is lost, both of which affect the power balance, there may be an increase in the rotational speed of a generator and hence cause an increase in the frequency of generated electricity and hence grid frequency.

An existing method of addressing undesirable frequency changes is to run generators at reduced capacity, for example, the power output of a generator may be set at 95% of the total output capacity of the generator. If there is, for example, a change in power balance, resulting in a change in grid frequency, these generators can respond by providing, within a few or a few tens of seconds, an increased or reduced power output accordingly.

It is uneconomical, however, to run generation units at reduced power output level in anticipation of events which may be relatively seldom. Moreover, the speed at which generators are able to provide a response may not be sufficient to keep the grid frequency within the specified range, for example, for particularly sudden events, for events involving particularly large changes in frequency, or for events occurring in relatively small grids such as those associated with island nations such as the UK or New Zealand. The response provided within the first second or so after the sudden change can have the largest impact on reducing the negative effects associated with a deviation of the grid frequency from the nominal value, for example, damage to large electrical machines.

A further method of addressing changes in grid frequency is to arrange for devices, such as user appliances, to monitor grid frequency at their location and to react to changes in same according to predetermined criteria. For example, in response to a sudden drop in frequency, consumption of electrical power may be reduced in order to counteract against such changes. WO2011085477A1 provides an example of such a method. However, these approaches are inflexible as they are limited to effecting a local response to a local change in power balance. Moreover the collective response that a number of locally implemented responses provides is uncertain, and may, for example, lead to a collective over-response.

It is an object of embodiments of the present invention described herein to at least mitigate one or more problems of the prior art.

SUMMARY

According to a first aspect of the present invention, there is provided a control system for use in an electric power grid, electricity flowing in the grid in accordance with a grid frequency, wherein the electric power grid is connected to one or more of a distributed plurality of power units each arranged to consume electric power from and/or provide electric power to the electric power grid such that a change in power provision and/or consumption by a said power unit results in a change in power flow in the electric power grid, thereby changing a contribution of the power unit to the grid frequency, the control system comprising: a processing means: and a communications means, wherein the processing means is arranged to: monitor a grid frequency at one or more predefined locations in the electric power grid; determine that one or more conditions relating to the monitored frequency have been met; initiate, based on the determination, a control period during which the grid frequency at one or more of the one or more predefined locations is to be controlled; determine, based on the monitoring, one or more variation characteristics relating to a variation, during said control period, in grid frequency; send, via the communications means, control instructions to a first plurality of the distributed plurality of power units, the control instructions comprising instructions to control power flow to and/or from each of the first plurality of power units so as to control the monitored frequency, wherein the control instructions are generated on the basis of: profile information relating to the distributed plurality of power units, the profile information including information relating to one or more power consumption and/or provision characteristics of the first plurality of power units; and the determined one or more variation characteristics, such that the first plurality of power units provides a time-varying contribution to the grid frequency during said period.

In some embodiments, the first plurality is selected from the distributed plurality on the basis of the profile information.

In some embodiments, the selection of power units to include in the first plurality is made in response to the determination that the one or more conditions relating to the monitored frequency have been met.

In some embodiments, the control system according comprises a data store storing the profile information.

In some embodiments, the data store is arranged to store profile information relating to one or more power consumption and/or provision characteristics of one or more groups of power units, wherein the groups are formed from at least some of the first plurality of distributed power units.

In some embodiments, the one or more groups of power units consist of power units with one or more of a common or similar power class, response time characteristic, grid location and/or geographical location.

In some embodiments, the one or more power consumption and/or provision characteristics relate to one or more of a provision capacity, a consumption capacity, a characterizing response time, a characterizing response function, a provision or consumption status, and an availability status.

In some embodiments, the control system comprises one or more measurement devices for performing one or more measurements relating to grid frequency, and wherein the determined one or more variation characteristics are derived from the one or more measurements.

In some embodiments, the control system is arranged to receive from, one or more remote measurement devices, one or more indications that the one or more conditions relating to the monitored frequency have been met, and the determination that one or more conditions relating to the monitored frequency have been met is based at least partly on the condition.

In some embodiments, the determination that the one or more conditions have been met comprises comparing one or more values associated with the monitored frequency to one or more thresholds.

In some embodiments, the determination comprises evaluating whether the one or more values lie within one or more ranges, wherein each of the one or more ranges is defined as lying between two of the thresholds, and wherein the one or more conditions are met when one or more of the one or more values lie outside one or more of the one or more ranges.

In some embodiments, one of the one or more values relate to a forecasted value of grid frequency.

In some embodiments, the forecasted value is generated on the basis of forecasting procedure, the procedure comprising: defining a series of values associated with the monitored frequency, and determining a polynomial function on the basis of the series of values associated with the monitored frequency.

In some embodiments, the one or more variation characteristics are determined on the basis of a forecast of a variation in grid frequency.

In some embodiments, the forecast of the grid frequency comprises: defining a series of values associated with at least one frequency characteristic, and determining a polynomial function on the basis of the series of values associated with the at least one frequency characteristic.

In some embodiments, the processing means is further arranged to: define a first series of values associated with a first frequency characteristic during a first time period and a second series of values associated with the first frequency characteristic during a second, later, time period; determine a first polynomial function having a first set of coefficients on the basis of said first series of values and a second polynomial function having a second set of coefficients on the basis of said second series of values.

In some embodiments, the control instructions are generated on the basis of a difference between the first set of coefficients and the second set of coefficients.

In some embodiments, the determination that the one or more conditions have been met comprises evaluating a difference between the first set of coefficients and the second set of coefficients.

In some embodiments, the determination that the one or more conditions have been met further comprises a determination that a difference between one of the coefficients of the first set of coefficients and one of the coefficients of the second set of coefficients is below or above a predetermined threshold and/or within a predetermined range.

In some embodiments, the frequency characteristic is related to one or more of a frequency of alternating voltage, a frequency of alternating current, a frequency of power flowing in the electric power grid; a rate of change of frequency; and a period of alternating current.

In some embodiments, sending the control instructions comprises: sending a first set of one or more control instructions, and sending, subsequent to sending the first set of one or more control instructions, one or more further sets of one or more control instructions.

In some embodiments, at least one of the one or more further sets of one or more control instructions is generated in response to a determination, based on a monitoring, subsequent to the sending of the first set of one or more control instructions, of the grid frequency, that one or more further conditions have been met.

In some embodiments, the one or more further conditions comprise that one or more values relating to the monitored frequency characteristic are below or above a predetermined threshold and/or within a predetermined range of values.

In some embodiments, at least one of the further sets of one or more control instructions are sent to a second plurality of the distributed plurality of power units, wherein the second plurality is different from the first plurality.

In some embodiments, the processing means is arranged to generate a control schedule on the basis of the profile information and send the control instructions on the basis of the control schedule, the control schedule specifying one or more times at which to control power flow to and/or from the first plurality of power units.

In some embodiments, the control schedule is generated according to a desired temporal profile of the monitored grid frequency.

In some embodiments, the control instructions comprise one or more of: instructions to turn off, turn on, increase or decrease power provision, increase or decrease power consumption, change power provision and/or consumption for a certain time, change power provision and/or consumption according to a specified time profile.

According to a second aspect of the present invention, there is provided a method of controlling frequency of electricity in an electric power grid, electricity flowing in the grid in accordance with a grid frequency, wherein the electric power grid is connected to one or more of a distributed plurality of power units each arranged to consume electric power from and/or provide electric power to the electric power grid such that a change in power provision and/or consumption by a said power unit results in a change in power flow in the electric power grid, thereby changing a contribution of the power unit to the grid frequency, the method comprising: monitoring a grid frequency at one or more predefined locations in the electric power grid; determining that one or more conditions relating to the monitored frequency have been met; initiating, based on the determination, a control period during which the grid frequency at one or more of the one or more predefined locations is to be controlled; determining, based on the monitoring, one or more variation characteristics relating to a variation, during said control period, in grid frequency; sending, via the communications means, control instructions to a first plurality of the distributed plurality of power units, the control instructions comprising instructions to control power flow to and/or from each of the first plurality of power units so as to control the monitored frequency, wherein the control instructions are generated on the basis of: profile information relating to the distributed plurality of power units, the profile information including information relating to one or more power consumption and/or provision characteristics of the first plurality of power units; and the determined one or more variation characteristics, such that the first plurality of power units provides a time-varying contribution to the grid frequency during said period.

According to a third aspect of the present invention, there is provided a computer program comprising a set of instructions which, when executed on a processing unit, causes the processing unit to perform a method according to the second aspect.

According to a fourth aspect of the present invention, there is provided a computer readable medium with a set of instructions stored thereon which, when executed on a processing unit, cause the processing unit to perform a method according to the second aspect.

DETAILED DESCRIPTION OF CERTAIN INVENTIVE EMBODIMENTS

Figure 1:
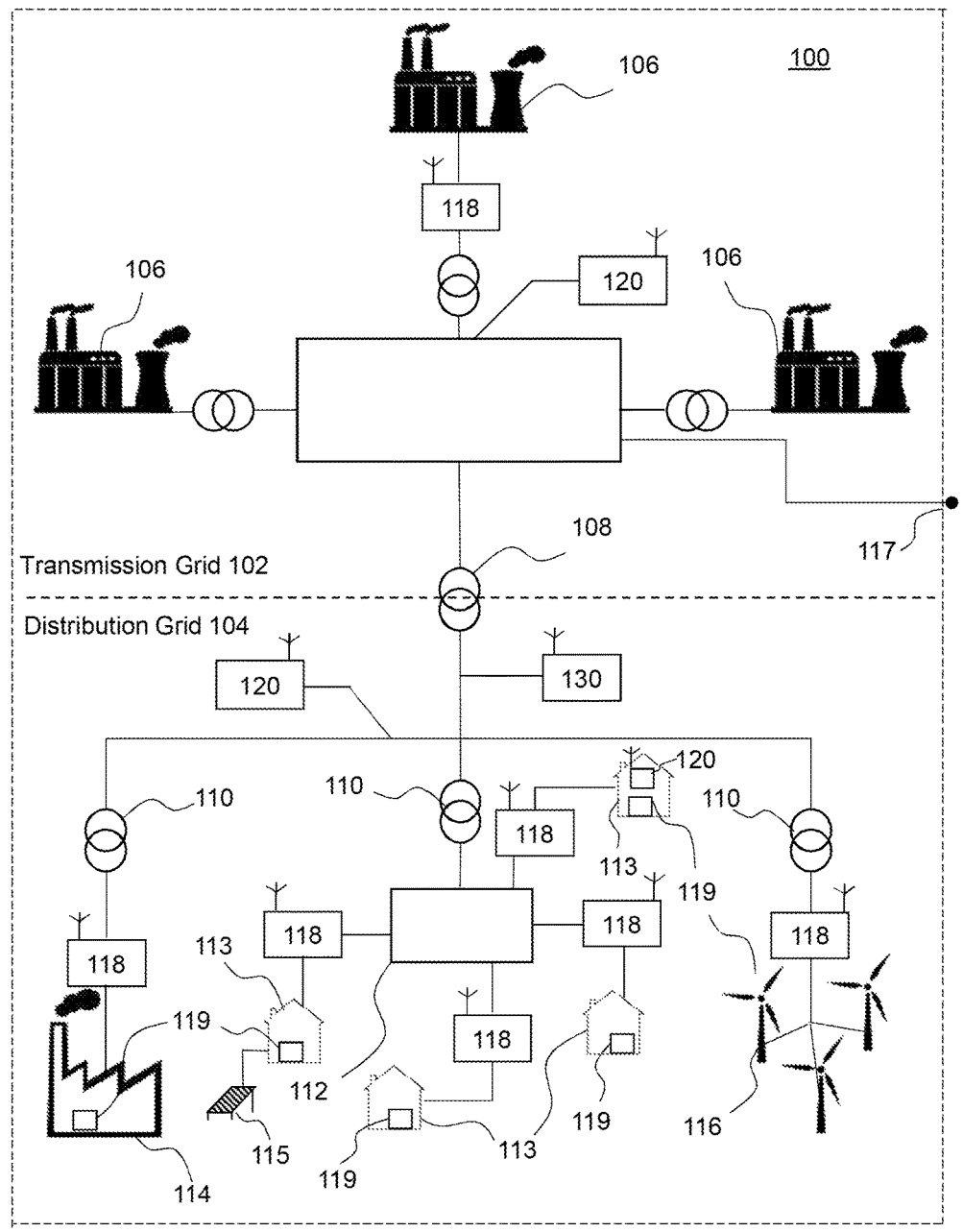
FIG. 1 is a schematic diagram illustrating a synchronous electric power grid in which the invention may be implemented.

Supply of electricity from providers such as power stations, to consumers, such as domestic households and businesses, typically takes place via an electricity distribution network or electric power grid. FIG. 1 shows an exemplary electric power grid 100, in which embodiments of the present invention may be implemented, comprising a transmission grid 102 and a distribution grid 104.

The transmission grid 102 is connected to power generators 106, which may be nuclear plants or gas-fired plants, for example, from which it transmits large quantities of electrical energy at very high voltages (typically of the order of hundreds of kV), over power lines such as overhead power lines, to the distribution grid 104.

The transmission grid 102 is linked to the distribution grid 104 via a transformer 108, which converts the electric supply to a lower voltage (typically of the order of 50 kV) for distribution in the distribution grid 104.

The distribution grid 104 is connected via substations 110 comprising further transformers for converting to still lower voltages to local networks which provide electric power to power consuming devices connected to the electric power grid 100. The local networks may include networks of domestic consumers, such as a city network 112, that supplies power to domestic appliances within private residences 113 that draw a relatively small amount of power in the order of a few kW. Private residences 113 may also use photovoltaic devices 115 to provide relatively small amounts of power for consumption either by appliances at the residence or for provision of power to the grid. The local networks may also include industrial premises such as a factory 114, in which larger appliances operating in the industrial premises draw larger amounts of power in the order of several kW to MW. The local networks may also include networks of smaller power generators such as wind farms 116 that provide power to the electric power grid.

Although, for conciseness, only one transmission grid 102 and one distribution grid 104 are shown in FIG. 1, in practice a typical transmission grid 102 supplies power to multiple distribution grids 104 and one transmission grid 102 may also be interconnected to one or more other transmission grids 102.

Electric power flows in the electric power grid 100 as alternating current (AC), which flows at a system frequency, which may be referred to as a grid frequency (typically 50 or 60 Hz, depending on country). The electric power grid 100 operates at a synchronized frequency so that the frequency is substantially the same at each point of the grid.

The electric power grid 100 may include one or more direct current (DC) interconnects 117 that provide a DC connection between the electric power grid 100 and other electric power grids. Typically, the DC interconnects 117 connect to the typically high voltage transmission grid 102 of the electrical power grid 100. The DC interconnects 117 provide a DC link between the various electric power grids, such that the electric power grid 100 defines an area which operates at a given, synchronized, grid frequency that is not affected by changes in the grid frequency of other electric power grids. For example, the UK transmission grid is connected to the Synchronous Grid of Continental Europe via DC interconnects.

The electric power grid 100 also includes power units 119 which may consume power from or provide power to the electric power grid 100. Each power unit 119 has associated with it a device for controlling the provision and/or consumption of power from the associated power unit 119 (herein referred to as "power unit controllers" (PUCs) 118).

The electric power grid 100 also includes a measurement system in the form of measurement devices 120 arranged to measure the synchronous operating frequency of the grid (hereinafter referred to as the grid frequency).

The power unit controllers 118 may be provided separately to, and/or installed on, the power units 119. An advantage of a power unit controller being installed on the power unit is that the PUC may then take the form of a dedicated device, with information stored therein being specific to the power unit installed thereon, hence reducing the need for the PUC to be programmable, and hence reducing costs associated with providing programmable functionality (e.g. a user interface). However, an advantage of a power unit controller being provided separately to a power unit is that the PUC can take the form of a generic programmable device and be applied to any power unit, hence increasing flexibility.

The power units 119 may include power generators 106, appliances in residential premises 113 or industrial premises 114 and/or small-scale power generators such as wind turbines 116 or solar panels 115.

A power unit controller 118 may be associated with a number of power units 119. For example, in a wind farm 116, it may be that although there are many turbines in the wind farm, all of the turbines' power output is supplied to the grid via a single connection to the grid, in which case there may only be one power unit controller 118 associated with the single connection.

Although, for the sake of simplicity, only seven power unit controllers 118 are shown in FIG. 1, it will be understood that, in practice, the electric power grid 100 may comprise hundreds or many thousands of such devices. Furthermore, it will be understood that although, for the sake of simplicity, only three measurement devices 120 are shown in FIG. 1, in practice many measurement devices 120 may operate in the same synchronous electric power grid 100, as described in more detail below with reference to FIG. 4.

The electric power grid of FIG. 1 also includes an exemplary embodiment of the control system of the present invention, a Control Node (CN) 130, described in more detail below with reference to FIG. 3, which is communicative with one or more of the power unit controllers 118 and one or more of the measurement devices 120 (an exemplary communication means being represented schematically in FIG. 1 by antennae), and can send control instructions to the power unit controllers 118 to effect a change in the power consumption and/or provision of the power units 119 with which the controllers 118 are associated. In controlling the power provision and/or consumption of power units in a grid, a power imbalance in the grid, manifest in the measured frequency, may be counteracted. For example, if a generator is suddenly lost from the grid, there will be a provision deficiency, the rotational speed of spinning generators with a given drive will reduce in response to the relative increase in load, the frequency of electricity so produced will accordingly reduce, and so the grid frequency will also reduce. If power units are controlled to reduce their consumption or increase their provision, however, then the relative increase in load experienced by the generators may be mitigated, for example, and the imbalance in power provision and consumption may be ameliorated, reducing the impact on grid frequency.

Figure 2A:
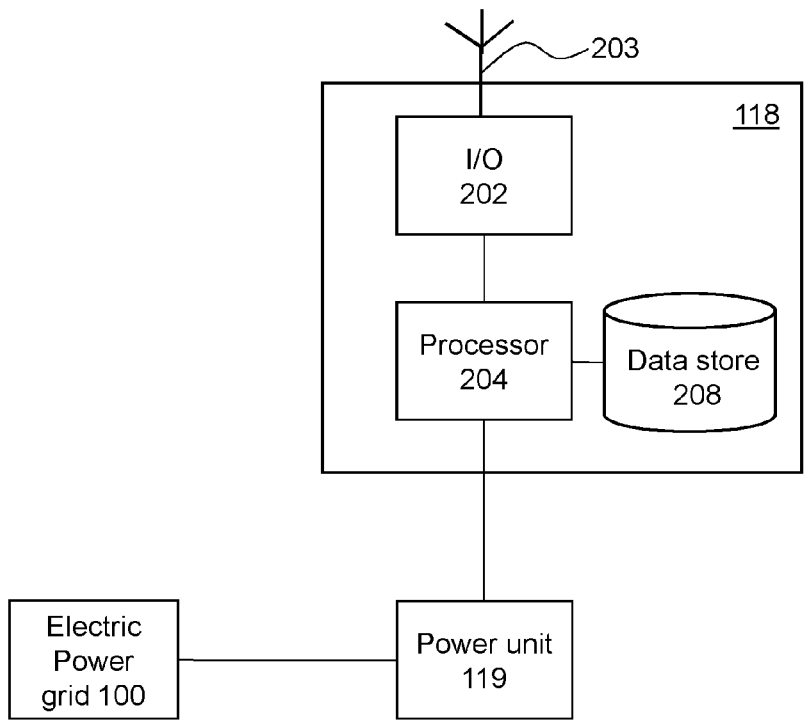
FIG. 2a is a schematic diagram illustrating an exemplary embodiment of a power unit controller for use with the present invention

FIG. 2a shows a schematic representation of an exemplary power unit controller (PUC) 118, connected to a power unit 119 which is itself connected to the synchronous electric power grid 100. In this exemplary embodiment, the PUC 118 comprises an input/output communications interface (I/O) 202, a processor 204, and a data store 208. The PUC 118 is arranged to control the operation of the power unit 119 with which it is associated. The I/O interface 202 is arranged to receive information, for example information representing control instructions from a CN 130, via a fixed or wireless communications network, which may include one or more of Global System for Mobile Communications (GSM), Universal Mobile Telecommunications System (UMTS), Long Term Evolution (LTE), fixed wireless access (such as IEEE 802.16 WiMax), and wireless networking (such as IEEE 802.11 WiFi). An exemplary communications means is represented schematically in FIG. 2a by the antenna 203 connected to I/O 202. The communications network may consist of a mixture of fixed and wireless communications means. The communications network may comprise mesh networks, for example a ZigBee mesh network. For example, in a communications network comprising such a mesh network, a CN 130 may communicate with a first PUC 118 via one or more other PUCs 118 of the mesh. The communications network may comprise a plurality of mesh networks, for example, each distributing control instructions to PUCs 118 in the vicinity of a PUC 118 connected, for example, to a fixed communications network.

Information received at the I/O interface 202 may be processed by the processor 204 and stored in the data store 208.

The processor 204 may be arranged to convert the received information into control instructions which the associated power unit 119 is capable of interpreting and implementing, as described below.

The data store 208 may store profile information relating to the power unit 119 with which it is associated. This information may, for example, comprise information relating to an identification number of the associated power unit 119, a unit availability status, a unit geographical or grid location indication, a unit control history, a remuneration rate associated with the use of the unit, or a schedule of planned use of the unit. The profile information may also comprise information relating to one or more power consumption and/or provision characteristics of the power unit 119 with which the PUC 118 is associated, which, for example, may comprise a provision capacity, consumption capacity, a characterizing response time, a characterizing response function, or a provision or consumption status.

Information stored in the data store 208 may be communicated to and/or from the PUC 118, for example, from and/or to a CN 130 via the I/O 202. The ability of two way communication may be advantageous in that a change in the profile information stored in the data store 208 of the PUC 118, for example, a change in availability status, may be communicated to the CN 130 which can then update the profile information it stores. Conversely, in addition to the PUC receiving control instructions from the CN, the CN may also communicate profile information to the PUC so that it may update its records, for example profile information regarding an identification number or a group allocation.

Having regard to the information stored in the data store 208, the processor may interpret a generic control instruction received at the I/O 202, and implement control of the power unit 119 specific to the power unit 119. For example, a generic control instruction may be received by the I/O 202 of the PUC 118 to the effect of "power units of class X with location indicator Y reduce consumption to Z % of your consumption capacity", and be implemented, or indeed not implemented, as appropriate, by the PUC 118 according to the information in the data store 208.

Specific control instructions may be sent to and received by an I/O 202 of a specific PUC 118, and the processor may implement the instruction without reference to the profile information stored in the data store. For example, this may take the form of a broadcast message containing, for example, a header which specifies the power unit for which the instruction is intended, for example, by use of a identification number unique to each power unit or group of power units, and each power unit or group of power units only responding to control instructions whose header contains their unique or group identification number. Broadcast messages may be advantageous in that the communications bandwidth between a CN and the PUCs required may be relatively narrow, as relatively few separate instructions need to be broadcast. Broadcasting may also be advantageous in scenarios where communication by other means, for example over existing computer networks, is expensive or not possible, for example, in remote locations.

The specific control instruction may also take the form of a control instruction that is sent specifically to each power unit, for example, each power unit may have its own Internet Protocol (IP) address, and the specific control instructions may be sent to the specific IP address associated with the power unit for which the control instructions are intended. An advantage of sending specific control instructions sent specifically to each PUC is that it reduces the requirement on the PUCs to listen for and interpret control instructions, and may take advantage of existing packet switched networks which have relatively large bandwidths. The communications channel for receiving specific control instructions may also be used for the PUC communicating with the CN, for example, sending updates of its profile information.

Figure 2B:
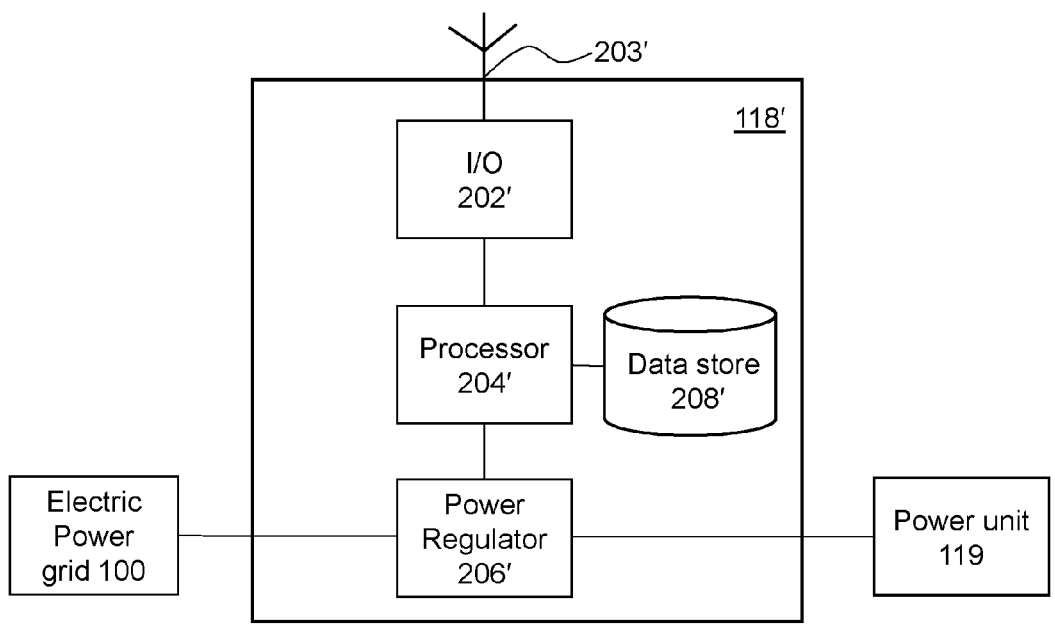
FIG. 2b is a schematic diagram illustrating an exemplary embodiment of a power unit controller for use with the present invention.

FIG. 2b shows an alternative exemplary embodiment of a PUC 118', comprising an input/output communications interface 202' connected to an antenna 203', a processor 204', a data store 208', and a power regulator 206'. In this embodiment, the power unit 119 is connected to the synchronous electric power grid 100 via the power regulator 206'. The PUC 118' may operate in substantially the same way as PUC 118 of FIG. 2a, except that instead of the processor 204 controlling the operation of the associated power unit 119 to effect a power consumption and/or provision from and/or to the grid 100, the processor 204' of the PUC 118' controls the power regulator 206' which is arranged to regulate the power available for consumption by the power unit 119 and/or the power provided to the grid 100 of the power made available by the power unit 119. For example, the PUC 118' may be implemented in the plug of a consumer device, and may regulate, for example, the maximum power capable of being drawn by the device.

This alternative embodiment of a PUC 118' may be advantageous for power units which have no internal control circuitry (for example a transformer), or have control circuitry which has no means of interfacing with external control circuitry or responding to control instructions or signals (for example old domestic heating appliances, such as thermostat-controlled heating elements etc.), where it is expensive or difficult to control a power unit via control circuitry, or where it is convenient to control a set of power devices which share, at some point, a single common electrical connection to the grid (for example, all appliances in a single residence).

An example of the control system of the present invention is a Control Node 130, described in more detail below with reference to FIG. 3.

Figure 3:
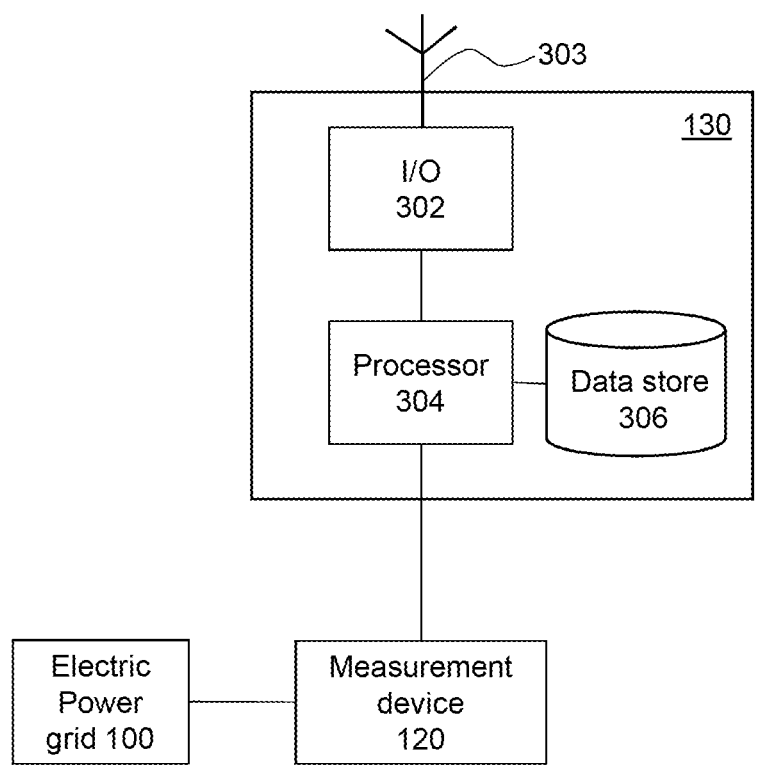
FIG. 3 is a schematic diagram illustrating an exemplary embodiment of a Control Node for use with the present invention.

FIG. 3 is a schematic representation of an exemplary embodiment of a Control Node (CN) 130, comprising a communication means in the form of an input/output communications interface (I/O) 302, a processing means in the form of a processor 304, and a data store 306. In this exemplary embodiment, the CN 130 is communicatively connected to a measurement device 120 arranged to measure a grid frequency of the synchronous electric power grid 100. An exemplary communications means is represented schematically in FIG. 3 by the antenna 303 connected to I/O 302.

The measurement device 120 may be incorporated into the CN 130.

The measurement device 120 may be remote from the CN 130. There may be more than one measurement device 120 communicatively connected to a CN 130, and the different measurement devices 120 may have different geographical or grid locations, and measure different local characteristics related to grid frequency.

There may be more than one CN 130 operating in relation to the grid 100, and each measurement device 120 may be communicatively connected to each CN 130.

The measurement device 120 may be any device capable of detecting or measuring grid frequency within a synchronous area of an electric power grid with sufficient precision.

A time period relating to the grid frequency may be used as a measure of the grid frequency. For example, a measurement of the half-cycle, which is the period between times at which the voltage crosses 0V, may be used as a measure of the grid frequency.

In some embodiments, the instantaneous grid frequency, corresponding to the inverse of the time it takes to complete a half-cycle (or a full-cycle) may be determined. The frequency data may be equalized and digitally filtered to remove frequency components, for example, relating to noise.

The measurement device 120 may comprise a voltage detector arranged to sample the voltage at a frequency higher than the grid frequency and an analogue to digital converter arranged to convert the sampled voltage to a digital voltage signal. For example, the voltage detector may be arranged to sample the voltage 1000 times per cycle. The digital voltage signal may then be processed to determine with a high degree of precision (within the range μs to ms) the times at which the voltage crosses 0V.

The measurement device 120 may comprise a current detector arranged to sample the current at a frequency higher than the grid frequency, and an analogue to digital converter arranged to convert the sampled current to a digital current signal, which may then be processed to determine with a high degree of precision (within the range of, for example, μs to ms) the times at which the current crosses 0V, or other characteristics associated with the current waveform.

The measurement device 120 may comprise both a voltage detector and a current detector. Measuring the times at which both the voltage and current crosses 0V enables the measurement device 120 to determine a change in the relative phase of the voltage and current, thereby enabling the measurement device 120 to compensate for changes in reactive power in the synchronous area of the grid. This in turn enables a more accurate measurement of frequency (or a characteristic relating to frequency).

In the embodiment shown in FIG. 3, the grid frequency measured by the measurement device 120 is communicated to the processor 304 of the CN 130, and may be stored in the data store 130.

The processor 304 may be arranged to determine characteristics relating to the grid frequency using the grid frequency measurements communicated by the measurement device 120, for example, a frequency of grid frequency, a rate of change of grid frequency (i.e. its first derivative with respect to time) or the curvature of the change of grid frequency (i.e. its second derivative with respect to time). These characteristics may be stored in the data store 306.

In some embodiments, the measurement device 120 comprises a processing means, for example, in the form a processor, and the processor of the measurement device 120 may be arranged to determine characteristics relating to the grid frequency. This may be advantageous in that it may reduce the amount of information needing to be communicated by the measurement device, and also that it may reduce the burden placed on the processor of the CN, i.e. enable a distributed processing of the measured frequency.

The data store 306 of the exemplary embodiment of a CN shown in FIG. 3 may contain profile information relating to power units 119 connected to the synchronous electric power grid 100. This profile information may comprise some or all of the profile information that may be stored in the data store 208 of the exemplary embodiment of a PUC 118 shown in FIG. 2a as described above. The profile information stored in data store 306 may also comprise communication details of power units 119 connected to the grid. The data store 306 may also contain profile information relating to a group of power units. For example the group information may comprise the identification of power units who are members of the group, collective power consumption and/or provision characteristics produced by the group, and a collective characterizing response time or characterizing response function of the group. The groups may be formed from similar power units, for example from power units with a common or similar power class. A group may be formed, for example, from power units whose maximum operational power consumption is in the range 1-10 kW. Groups may also be formed, for example, from power units who have a common or similar response time characteristic, grid location, geographical location, availability by time/day/week/month/season/year and/or last contribution or any other feature. Grouping the power units and having information of collective properties of the group may be advantageous in the generation of the control instructions, since it may reduce the need to identify individually every power unit which may be used to effect a given collective response, and reduce the need to generate a separate control instruction for every individual power unit.

The data store 306 may be remote from the CN 130, and may be distributed, for example, amongst the data stores 208 of associated PUCs 118, and the processor 304 may instead draw some information, for example profile information, for use in processing via the I/O 302. This may reduce the storage requirements for a CN and reduce the redundancy of stored information in the system. The I/O 302 may communicate with the I/Os 202 of the PUCs 118 via any fixed or wireless communication means, examples of which were given above with reference to the I/O 202 of the PUC 118 of FIG. 2a. There may also be a single or multiple centralized, large capacity data stores, communicative with the CN 130, which store the entirety of the profile information of power units of the system. This may be advantageous for backup purposes and may also be a more cost effective way of storing large amounts of information than on many small data stores.

The processor 304 is arranged to generate control instructions for sending, via the I/O 302, to one or more of the PUCs 118 associated with power units 119, based on variation characteristics related to the grid frequency measured at one or more measurement devices 120, and based on profile information relating to the power units 119.

Figure 4:
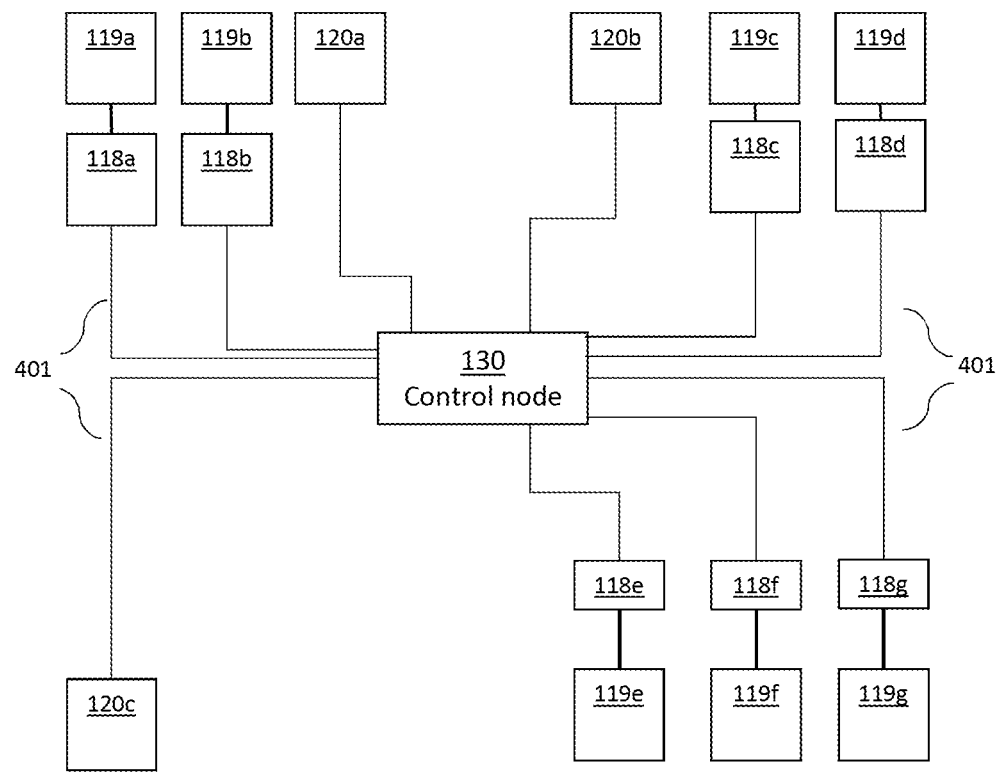
FIG. 4 is a schematic diagram illustrating an exemplary network in which the invention may be implemented.

FIG. 4 is a schematic diagram of an exemplary implementation of a control node 130 in an exemplary network, according to an embodiment of the present invention. The exemplary network further comprises power units 119a to 119g each associated with a corresponding power unit controller (PUC) 118a to 118g, and measurement devices 120a to 120c. The CN 130 is communicatively coupled to each of the PUCs 118a to 118g and to each of the measurement devices 120a to 120c by communication links 401, the communication links 401 being provided by any fixed or wireless communications means, for example those communications means already described above with reference to FIG. 2a. Measurement devices (e.g. 120a) may be in the same or similar geographical or grid location as some of the power units (e.g. 119a and 119 band/or in a location remote from any power units.

In the exemplary implementation shown in FIG. 4, the control node 130 receives measurements of grid frequency from the measurement devices 120, generates control instructions based on the measured frequency and based on the profile information of the power units 119a to 119g, and sends the control instructions to one or more of the PUCs 118a to 118g in order to control power provision and/or consumption of the associated power units 119a to 119g. Coordinating the control of grid frequency from a centralized control node has multiple advantages over, for example, uncoordinated local control over local power units. For example, a centralized control enables a grid-wide response to be coordinated in response to local, regional and/or grid wide changes in grid frequency, and allows an overview of the collective response of all of the controlled power units. The responses provided may be coordinated to be time-varying, so that different power units make different contributions at different times during the control period, improving flexibility and enabling a tailored response taking account of the variation in the grid frequency during the control period (e.g. the deviation of the grid frequency from a nominal value increasing or decreasing). This variation may be determined in advance according to techniques described below, or based on on-going monitoring of the grid frequency during the control period. Control of different power units may be implemented a staggered fashion, for example to take account of a change in one or more variation characteristics, for example an increasing deviation or rate of deviation from the nominal frequency as a dynamic response.

Figure 5:
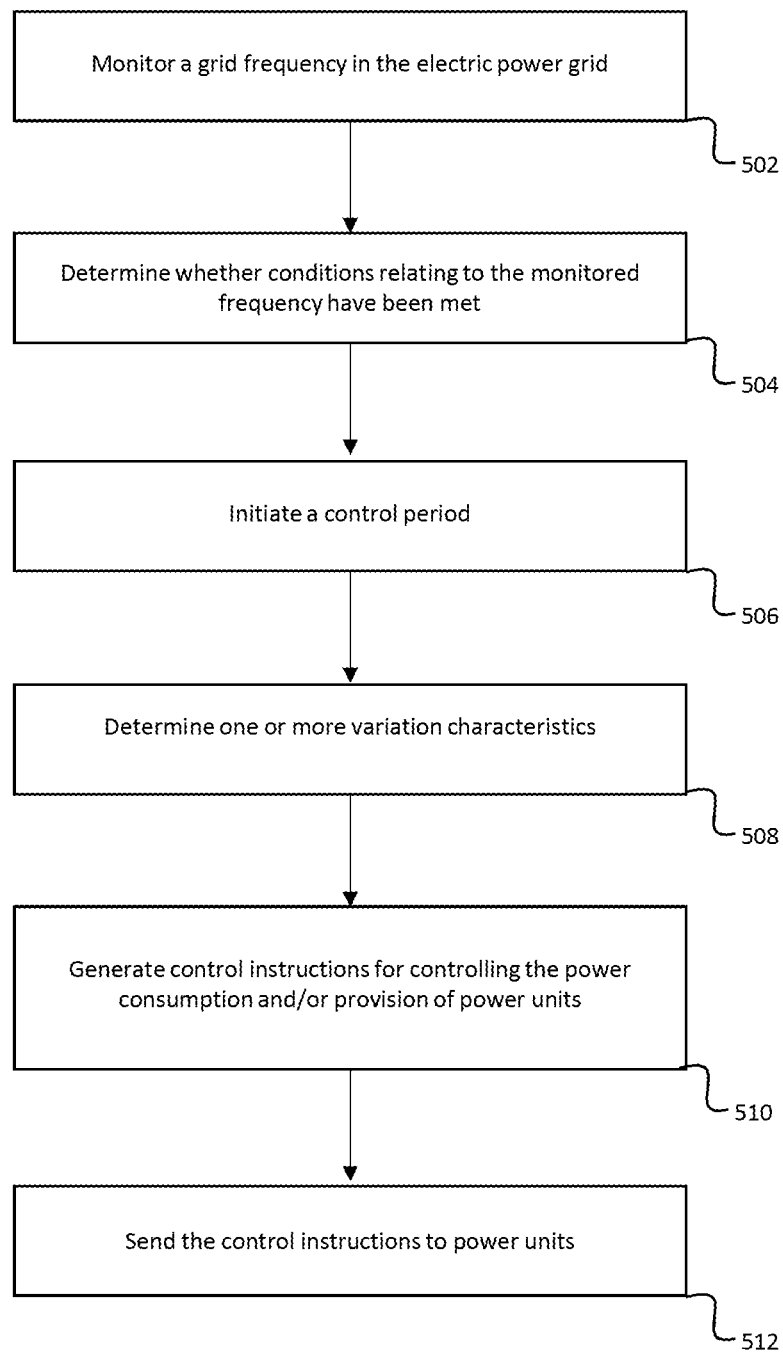
FIG. 5 is a flow chart illustrating steps carried out according to an embodiment of the present invention.

FIG. 5 is a flow diagram outlining an exemplary procedure according to embodiments of the present invention for controlling power units to provide a contribution to grid frequency. This may be done in order to, for example, provide a contribution to manipulating the grid frequency to a desired or nominal value in response to an event such as a sudden change in grid frequency.

In step 502, the grid frequency at one more predefined locations in the grid is monitored. The monitoring may comprise receiving, at the CN 130 the results of measurements of the grid frequency made at one or more measuring devices 120 at the one or more predefined locations as already described above with reference to FIG. 3. The results of the measurements may be communicated to the processor 304 of a CN 130. The processor 304 may process and store, in the data store 306, values associated with the measured frequency. Measuring grid frequency at more than one location enables a grid-wide picture of frequency behavior to be established, and hence enables the most effective response to be coordinated, for example a large change in grid frequency effected in one area may only need to be compensated for by a response in a related area, but the change in that area may be indicative of a response that may be required in other areas. For example, if a large change in grid frequency is measured in a location with low grid inertia, then this may be indicative that a different, remote area of the grid with high inertia may shortly experience a significant frequency change, and may, for example, inform analysis of measurements from the high inertia locality that any change in frequency detected in this high inertia locality, rather than being, say, noise, it is likely to be due to a real frequency change.

In step 504, the processor of the CN 130 determines whether one or more conditions relating to the monitored grid frequency have been met. These conditions may be conditions on whether to initiate a control period in which to control power units in order to restore the grid frequency to a nominal value.

The processor may be arranged to determine that a condition of step 504 has been met by comparing one or more values associated with the monitored frequency to a threshold value, and that the condition is met when the threshold is crossed. The threshold value may be stored in the data store 306 of the CN 130, and or communicated to the processor 302 of the CN 130 for use in the comparing via, for example the I/O 302. The threshold value may be, for example, set within the limits of acceptable variation from the nominal frequency of the measured grid frequency set by the grid operator, for example at 49.5 Hz for a nominal value of 50 Hz, and when the measured frequency passes, for example, below 49.5 Hz, the threshold is passed and the condition met.

The processor may be arranged to determine that a condition has been met by evaluating whether the monitored frequency lies within a range of values, the range being bounded by two thresholds, and that the condition is met when the frequency lies outside the range. For example, the range might be set at 50±0.5 Hz, and the condition is met when the monitored frequency lies outside that range. Multiple ranges may be used to determine the severity of a frequency change, for example if the monitored frequency goes outside a first range, e.g. 50±0.2 Hz, then the frequency change is "low severity" and only a response appropriate to a "low severity" change is implemented. However, for example, if the monitored frequency goes outside a second range, e.g. 50±0.4 Hz, then the frequency change is of "high severity" and a response appropriate to a "high severity" change is implemented, which, for example, may involve more power units or a larger controlled change in power consumption and/or provision as appropriate.

In some embodiments, in order to reduce the time taken to respond to changes in grid frequency, locally measured frequency characteristics may be analyzed to enable early identification of significant changes in the grid frequency. This analysis may be performed at the processor 302 of the CN 130, for example, based on data collected from measurement devices 120, as described below. The analysis may be performed by fitting a mathematical function, such as a polynomial extrapolation function and/or conic extrapolation function, to a series of values of the monitored frequency (for example, plotted at a series of times in an observation window). This may involve using a "sliding window" approach to fit the function to a first series of values of the monitored frequency covering a first observation window. The window is then moved to fit the function to a second series of values of monitored frequency covering a second, later, window.

After a positive determination in step 504 that one or more conditions relating to the monitored frequency have been met, a control period during which the grid frequency at one or more of the one or more predefined monitoring locations is to be controlled is initiated in step 506.

The control period may be indefinite, for example, beginning at the initiation of the control period and continuing until a time where it has been determined that the monitored frequency has crossed a threshold or returned to within a range of frequencies, for example, the control period may end when the monitored frequency returns to lie within a range around the nominal grid frequency, for example, 50±0.5 Hz.

The control period may be of a predefined length, for example if it is predetermined that it is acceptable or desirable that the control of the power consumption and/or provision of power units be effected for only up to a maximum combined duration of, for example, five minutes, after which time, for example, it may not be economical to effect control in this way.

Subsequent to steps 502 to 506, in step 508, one or more variation characteristics relating to a variation, during said control period, in grid frequency is determined, based on the monitoring of the grid frequency.

In some embodiments, the processor 304 of the CN is arranged to determine the one or more variation characteristics.

The one or more variation characteristics may be derived from the monitored frequency, and may be determined in advance based on, for example, the mathematical techniques described below, and or based on continued monitoring of the grid frequency during the control period. The one or more variation characteristics may include an indication of a variation in the frequency during the control period, for example a variation in the deviation from a nominal value, and/or a representation of the "shape" of the frequency variation.

The variation characteristics may include one or more coefficients of a polynomial function fitted to monitored frequency in an observation window, or a forecasted value of monitored frequency at a specified time in the future, as described below with reference to FIGS. 6a to 6c.

The variation characteristics may include one or more differences between one or more coefficients of a first polynomial function fitted to a first series of values in a first observation window, and one or more coefficients of a second polynomial function fitted to a second series of values in a second, later, observation window, or even one or more further coefficients of further polynomial functions fitted to further series of values in further, later, observation windows, as described in more detail below with reference to FIGS. 7a to 7f.

It will be appreciated that the variation characteristics may change during the control period, and hence the determination of one or more variation characteristics of step 508 in FIG. 5 may occur continuously, or at intervals during the control period. The variation characteristics determined during the control period may include any characteristic capable of describing the nature of the variation in monitored frequency in the control period. For example, whether the monitored frequency is or is likely to fall or rise, by how much, at what rate, according to what functional form, when and how it has or is likely to stop falling or rising, and when and how it has or is likely to meet a condition ending the control period, all of which may be determined by a continuous or intervallic analysis of the monitored frequency as described above with reference to steps 502 to 506.

On the basis of the one or more variation characteristics determined in 508, and on the basis of profile information relating to the distributed plurality of power units 119 connected to the grid 100, control instructions, for controlling the power consumption and/or provision of a first plurality of power units, may be generated, as represented in step 510 of FIG. 5. The control instructions may be generated so as to counteract a variation in grid frequency as indicated by the variation characteristics determined in step 508.

In some embodiments, the control instructions are generated by the processor 304 of the CN 130. The control instructions may be generated concurrent with or subsequent to the steps 502 to 508. In some embodiments where the control instructions are generated concurrently with steps 502 to 508, the control instructions may, for example, only be activated as, for example, control instructions authorized to be sent only once the determination that the one or more conditions of step 504 have been met.

In step 512 of FIG. 5, the control instructions generated in step 510 are sent to the first plurality of power units, which are thereby controlled to provide a time varying contribution to the grid frequency during the control period. The control instructions are sent to the I/O 202 of the PUC 118 associated with each power unit, via the I/O 302 of the CN 130.

In an exemplary embodiment, the processor 304 is arranged to make a forecast of grid frequency, and determine whether a condition has been met based on a whether a forecasted value of grid frequency has crossed a threshold or lies outside a range of frequency. The process of determining whether a condition has been met according to a forecasted value of grid frequency is described below with reference to FIGS. 6a to 6c.

Figure 6A:
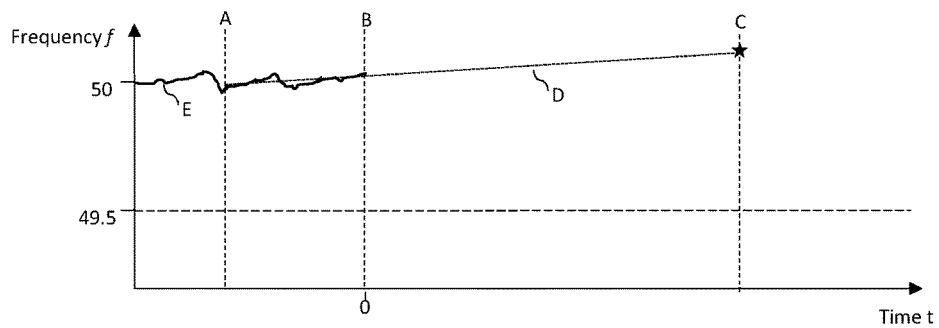
FIG. 6a is an exemplary plot of monitored grid frequency against time, illustrating an exemplary forecasting of a value of grid frequency.
Figure 6B:
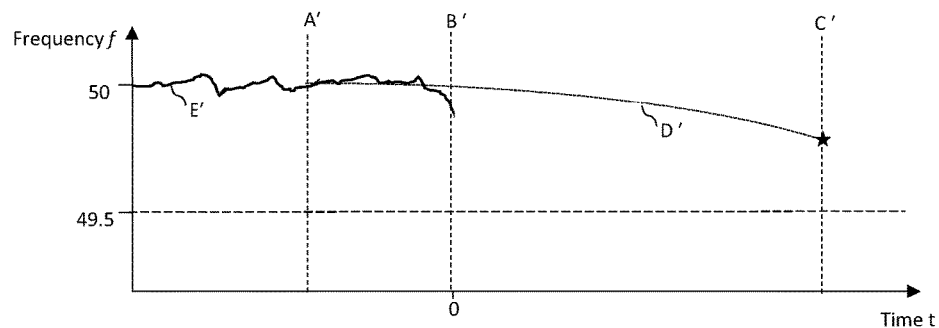
FIG. 6b is an exemplary plot of monitored grid frequency against time, illustrating an exemplary forecasting of a value of grid frequency.
Figure 6C:
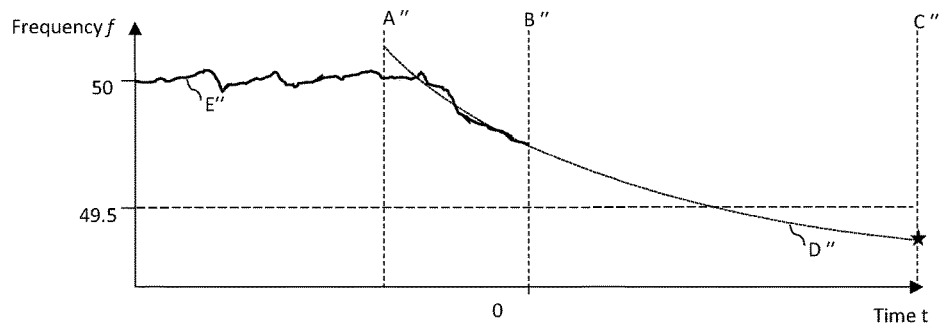
FIG. 6c is an exemplary plot of monitored grid frequency against time, illustrating an exemplary forecasting of a value of grid frequency.

FIGS. 6a to 6c show exemplary schematic plots of grid frequency f against time t, where, in each case, the monitored frequency is represented by the solid plot "E", and where the forecasted value of grid frequency is represented by the black star. The "0" on the time axis in each of FIGS. 6a to 6c represents a notional present in each case, and each of FIGS. 6a to 6c successively represent the plots of monitored frequency and forecasted frequency at successively later times. The hypothetical nominal grid frequency of normal operation in these examples is 50 Hz, and the hypothetical 'acceptable range' of frequency is ±0.5 Hz. It will be appreciated however that the nominal grid frequency could be any frequency of a synchronous electric power grid chosen to be the nominal operational value, and that the 'acceptable range' of grid frequency could be any range that it is desired to maintain the grid frequency within.

FIG. 6a is the earliest plot in the series, and shows the recorded monitored frequency "E" up until the notional present at time "0" being close to 50 Hz. An observation window is defined between two times "A" and "B", where time "B" is defined as the notional present "0", and time "A" is defined as a set time in the past from point "B", for example, say 1 second. A polynomial fitting procedure, for example based on least squares fitting, is applied to the monitored frequency recorded in this observation window. For example, this procedure may determine the coefficients a, b, and c, of the function $f=at^2+bt+c$ in the observation window which results in the smallest sum deviation of the monitored frequency from the function. Once the coefficients are determined for the observation window, there can be a forecast of the grid frequency for some specified time in the future, $t=0+C$, by solving the equation for f with $t=C$, say for example, $C=2$ seconds, i.e. extrapolating the function fitted to the monitored frequency of the observation window to future times. In FIG. 6a, the function fitted is the observation window is largely linear, and an extrapolation of this function to time "C" results in the forecasted frequency represented by the solid star. The fitted function in FIG. 6a has a small gradient, and as a result the forecasted frequency lies within the range 50+/−0.5 Hz, and so, for example, the condition that the forecasted frequency lies outside the range 50+/−0.5 Hz has not been met in FIG. 6a.

FIG. 6b shows the same as in FIG. 6a, except that time has moved on, further monitored frequency "E'" has been plotted, and the observation window, defined between times "A'" and "B'", has moved on. The polynomial fitting procedure described above is now applied again to the monitored frequency contained in this later observation window. The function $f'=a't^2+b't+c'$ fitted for the observation window, represented by dashed line D' in FIG. 6b, has some curvature but little gradient, which reflects the fact that the monitored frequency decreased at the end of the observation window. A forecast for the frequency at time C' is made by solving f' for $t=C'$, where, say, $C'=2$ s, and this forecasted value is represented in FIG. 6b by the solid star. Again, the forecasted frequency does not lie outside the range 50+/−0.5 Hz, and so, for example, the condition that the forecasted frequency lies outside the range 50+/−0.5 Hz has not been met in FIG. 6b.

FIG. 6c shows the same as in FIG. 6b, except that time has further moved on, still further monitored frequency "E''" has been plotted, and the observation window, defined between times "A''" and "B''", has moved on further. The polynomial fitting procedure described above is now applied again to the monitored frequency contained in this still later observation window. The function $f''=a''t^2+b''t+c''$ fitted for the observation window, represented by dashed line D'' in FIG. 6c, has some curvature but a more substantial gradient, which reflects the fact that the monitored frequency was decreasing for nearly all of the observation window defined between "A''" and "B''". A forecast for the frequency at time C'' is made by solving f″ for t=C″, where, say, C″=2 seconds, and this forecasted value is represented in FIG. 6c by the solid star. Here, the forecasted frequency does lie outside the range 50+/−0.5 Hz, and so, for example, the condition that the forecasted frequency lies outside the range 50+/−0.5 Hz has been met in FIG. 6c, and so for example, the control period in which power units can be controlled may be initiated.

In a further exemplary embodiment, the processor is arranged to determine whether a condition has been met by comparing the coefficients of one or more functions fitted to monitored frequency in one or more successive observation windows, which is now described with reference to FIGS. 7a to 7f.

FIGS. 7a to 7f show variations of frequency with time t where values of the monitored frequency are fitted with a second order polynomial function. The functional form of the second order polynomial function is at2+bt+c and the parameters defining the form of the function are the coefficients a, b, and c. Here again, the polynomial function is fitted to the monitored frequency for each observation window successively, where "t=0" for the purposes of fitting is successively redefined to a consistent point within each successive observation window.

Figure 7A:
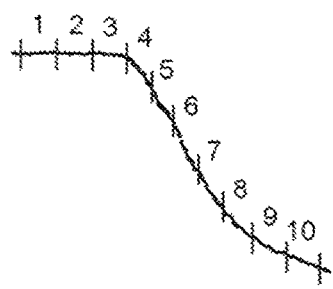
FIG. 7a is a diagram illustrating a series of intervals defined for a monitored frequency.
Figure 7D:
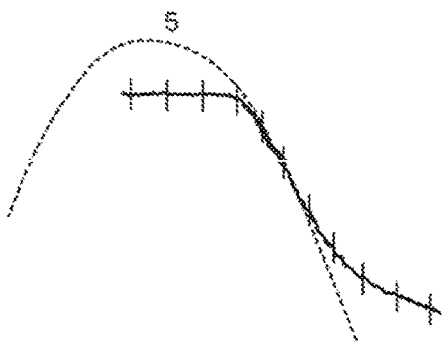
FIG. 7d is a diagram illustrating how a monitored frequency can be fitted with a polynomial function.
Figure 7B:
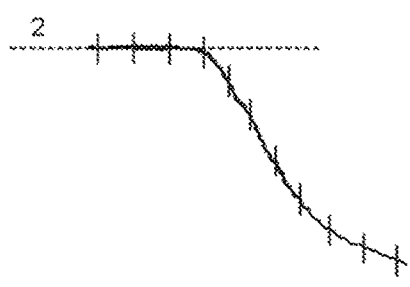
FIG. 7b is a diagram illustrating how a monitored frequency can be fitted with a polynomial function.
Figure 7E:
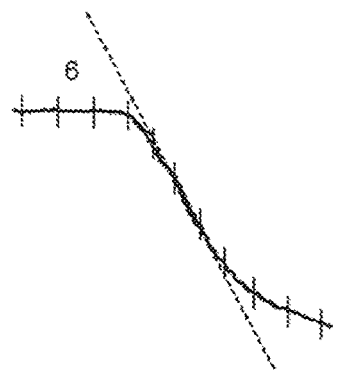
FIG. 7e is a diagram illustrating how a monitored frequency can be fitted with a polynomial function.
Figure 7C:
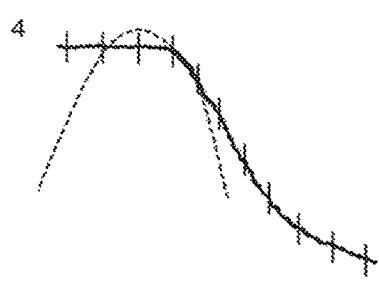
FIG. 7c is a diagram illustrating how a monitored frequency can be fitted with a polynomial function.
Figure 7F:
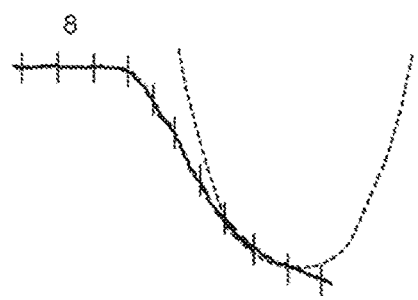
FIG. 7f is a diagram illustrating how a monitored frequency can be fitted with a polynomial function.

FIG. 7a shows a measured frequency characteristic over a period of ten observation windows, labelled 1 to 10. It can be seen that over the course of the 10 observation windows there is a change in the monitored frequency. In particular, the monitored frequency is stable during observation window 1, 2, and 3 and then begins to reduce in value in observation window 4. The rate of change of the monitored frequency increases slightly to a maximum rate of change at observation window 6 and then the rate of change decreases to observation window 10.

FIGS. 7b to 7f show the fitting of a second order polynomial function to the monitored frequency shown in FIG. 7a.

During observation window 2 (FIG. 7b), the monitored frequency is stable such that the fitted polynomial function reduces to a linear function whose gradient is close to zero.

During observation window 4 (FIG. 7c), the frequency characteristic begins to decrease. In this window, the monitored frequency may be best fitted with a polynomial function which describes an inverted parabola, as indicated by the dashed curve. This inverted parabola maybe characterized, for example, by a negative value of coefficient "a". During window 5 (FIG. 7d), the rate of change (rate of decrease) of the monitored frequency increases. Therefore, for example, the monitored frequency of window 5 (FIG. 7d) may be best fitted with a polynomial describing a sharper inverted parabola with a steeper gradient over the window. This steeper gradient might be characterized, for example, by an increase in the magnitude of coefficient "b".

During window 6 (FIG. 7e), the monitored frequency reduces further, but in a substantially monotonic manner, and therefore may be best fitted with a linear function. Linear functions have coefficient a=0, which also marks a point of inflection in the notional functional form of the monitored frequency.

During window 8 (FIG. 7f), the monitored frequency is passed a point of inflection and the rate of change of the monitored frequency is decreasing. Accordingly, the monitored frequency may be best fitted with a non-inverted parabola. This non-inverted parabola may be characterized, for example, by a positive value of coefficient "a". It can be seen from the above-described example that by comparing the coefficients of a polynomial function fitted to monitored frequency values for one observation window with the coefficients for a subsequent observation window, for example, it is possible to detect significant changes in the form of the fitted function such as the onset of a decrease (or indeed increase) of the monitored frequency (by detecting that the coefficients have a non-zero value), a change in the rate of change of the monitored frequency (by detecting a change in the magnitude of the coefficients) and a turning point or point of inflection in the monitored frequency (by detecting a change in sign of one or more of the coefficients). In this embodiment, a determination that one or more conditions have been met therefore may comprise determining the difference between one or more of the coefficients in successive observation windows, and determining whether the magnitude and/or sign of the differences lie within one or more ranges, and that the a condition is met when one or more of the differences lie outside one or more of the ranges.

Furthermore, by determining how the coefficients of the polynomial function change between time intervals it is possible to extrapolate the amount by which the frequency characteristic is likely to change. Typically, an accurate estimate of the total decrease (or increase) of the frequency characteristic can be made as the monitored frequency approaches the turning point (FIG. 7e); this typically corresponds with a time following the onset of the decrease of the frequency characteristic of about 500 ms, which may be a significantly shorter time frame than the time taken to reach a threshold value (for example, on the order of a few seconds).

In the above embodiments, different weighting can be given for monitored frequency in different observation windows, such that, for example, the largest weighting is given to monitored frequency in the most recent observation window. This weighting procedure can act as a filter in that it can decrease the influence of spurious components of the monitored frequency on the determination of the coefficients of the fitted functions.

The fitting procedure may be based on fitting of the monitored frequency to other functional forms, for example exponential functions, power functions, or polynomials of, for example, any order.

The conditions may be set with reference to a measurement of grid inertia in the area local to the measurement device 120. For example, the range of frequencies outside which a condition is met may be set relatively small for measurements from an area of the grid with a relatively large inertia, since for a given sudden change in power balance, the effect on grid frequency for an area with relatively large inertia will be relatively small.

The generation of the control instructions in step 510 of FIG. 5, and the contribution to the grid frequency which results from the control of the power units resulting from the sending of the control instructions to the power units of step 512 of FIG. 5, will now be described in more detail with reference to FIGS. 8a to 8c.

Figure 8A:
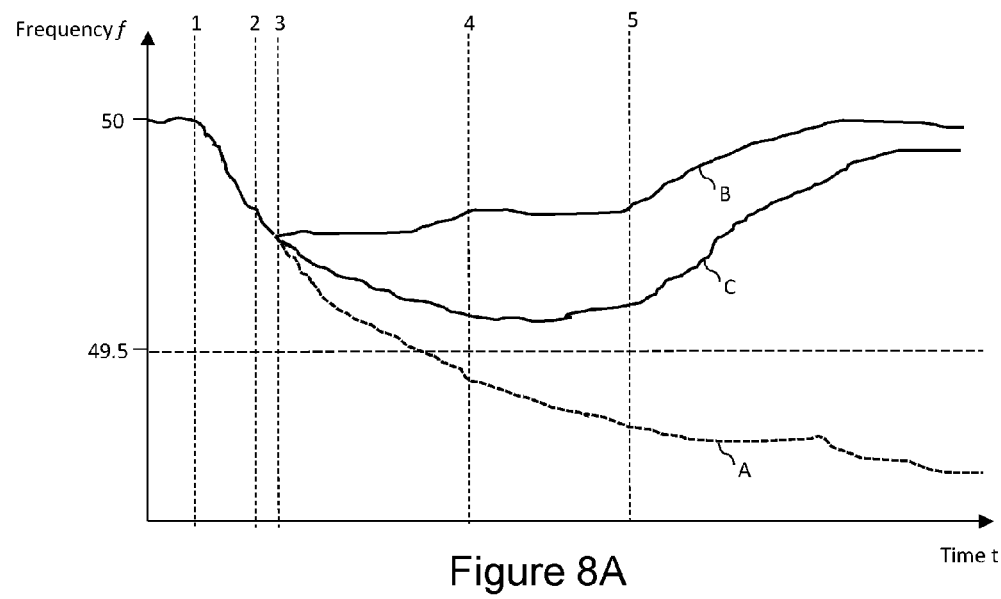
FIG. 8a is an exemplary plot of monitored grid frequency against time in three different scenarios.

FIG. 8a shows hypothetical plots of monitored frequency against time in three different hypothetical scenarios "A", "B", and "C", separated into intervals by specific points in time labelled 1 to 5.

In scenario "A" of FIG. 8a at 1, there is a sudden loss in power provision in the monitored area of the grid, and so the grid frequency reduces. In scenario "A", no action is taken in response to the sudden loss, i.e. the invention described herein is not deployed, and so the grid frequency continues to fall, albeit at a progressively slower rate of decline as the grid approaches an equilibrium at a new, lower, grid frequency, through 2 to 5, and, just before 4, drops below the hypothetical lower acceptable limit of grid frequency of 49.5 Hz. In a conventional method of addressing this scenario, it may be that a few seconds or tens of seconds after 1, another large generator in the grid increases its power provision, in order to return the grid frequency is returned to its nominal value. However, by this time, the grid frequency has already spent, say, tens of seconds outside of the hypothetical acceptable range about the nominal value.

In scenario B of FIG. 8a, the same sudden power imbalance of scenario A occurs at 1, and the frequency initially falls in the same way between 1 and 2. In this scenario, however, a control period in accordance with an embodiment of the present invention is initiated. From an analysis (as described above, for example) of the frequency monitored before 2, it is determined by the CN 130 that a condition has been met, and the control period should be initiated, and the control period is initiated at 2. In addition, in this exemplary scenario, frequency characteristics which characterize the way in which the grid frequency has and is likely to vary with time are derived from the analysis of the monitored frequency between 1 and 2 (using, for example, the methods described above with reference to FIGS. 6a to 6c and 7a to 7f). These frequency characteristics are combined, for example, with a characteristic of inertia in the area local to the monitoring to determine, for example, the magnitude of the power imbalance associated with the frequency change between 1 and 2, and hence the magnitude and duration of the power provision and/or consumption that would need to be controlled in order to compensate for the imbalance is calculated.

In exemplary scenario B, at 2, the processor 304 of the CN 130 also reads the profile information of the power units 119 from data store 306. The processor may then, for example, filter the power units 119 so as to only further consider power units whose profile information indicates they are available for control and, say, for this example, are either a power consumption unit that is currently consuming power, or a power provision unit that is currently not providing power at full capacity. The processor may then, for example, calculate, for each power unit remaining after the filtering, based on, for example further profile information such as power consumption and/or provision capacity, the control instructions that would need to be sent to each power unit in order to provide a combined response sufficient to compensate for the calculated imbalance. It may be, for example, that there is a power unit, or group of power units which can provide a sufficient response (e.g. sufficient in magnitude and speed at which the response can be delivered). This group is represented by block 804 in FIG. 8b, which is a schematic diagram showing an exemplary control schedule of power units, the control schedule being that associated with scenario B. The group represented by block 804 may comprise, for example, power provision units with a very short response time but a limited capacity of provision, for example industrial or commercial processes which can be terminated for short periods only.

At 2, control instructions are generated and sent to the group represented by block 804. There may be a short period of time, represented by block 802 of FIG. 8b, which the power units represented by block 804 take to respond to the control instructions, which lasts until 3.

As a result of the control of the group of power units represented by block 804, the monitored frequency of scenario B in FIG. 8a ceases to drop at 3, and slowly increases. It may be, however, that the power units of group 804 can only provide a response for a limited period of time, for example due to the limitations on the duration of interruptions of an industrial process, that limited period being shorter than the time determined to be needed, for example, to engage reserve generation which would bring the system generation/consumption into balance so as to restore the grid frequency to within the acceptable range about the nominal frequency. Additionally or alternatively, it may be that it is undesirable for the power units of group 804 to provide a response for an extended period of time since this may, for example, cause inconvenience to a user of a power unit.

Figure 8B:
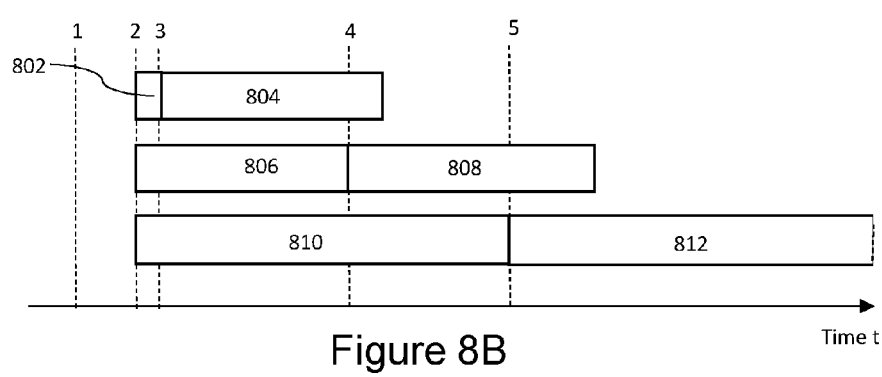
FIG. 8b is a diagram illustrating an exemplary control schedule generated according to an embodiment of the present invention.

Having determined this at 2 from the profile information, for example the characterizing response time or an indication of a maximum length of time of availability of time of the power units represented by block 804, the processor 304 of the CN 130 also generates and sends, at 2, control instructions for a second or second group of power units, represented by block 808 in FIG. 8b. The group represented by block 808 has a period for responding to the control instructions, represented by block 806, that is of an intermediate length, for example due to relatively slow control circuitry in the unit, and which therefore only begins to contribute to the response at 4, shortly before the response associated with the group represented by block 804 ceases.

The group of power units represented by block 808 may comprise, for example, refrigeration units which happen to be relatively slow to respond to control instructions, and which have specified in their profile information that they may only be switched off for a limited amount of time, for example to maintain a sufficient overall level of refrigeration. The control of power units represented by block 804 impacts the monitored frequency of exemplary scenario B in FIG. 8a, where the frequency is maintained at a steady level between 4 and 5.

As stated above, it may be, however, that the length of the control of the power units of block 808 is also limited, and the control of the group ceases after 5. Having determined this at 2 from the profile information of the power units of block 808, the processor 304 of the CN 130 also generates control instructions for a third or third group of power units, represented by block 812 in FIG. 8b. This group has a period for responding to the control instructions 810 that is relatively long, for example due to a relatively long run-up time of diesel generators of which the group is comprised, and which therefore only begin to contribute to the response at 5, shortly before the response associated with block 808 ceases.

The control of the units of block 812 impacts the monitored frequency of exemplary scenario B in FIG. 8a, where the frequency increases past 5 and returns to near the nominal frequency of 50 Hz. The control of power units of block 812 may continue (represented by the dashed end portion of block 812) until a determination is made that the control is no longer necessary in order to sustain the frequency close to the nominal value. It may also be that if a determination is made that the monitored frequency has returned to within an acceptable range of frequencies about the nominal frequency, the control period ceases, and if indeed the ceasing of the control period leads to a change in monitored frequency determined sufficient to initiate a further control period, then a further control will be implemented.

Figure 8C:
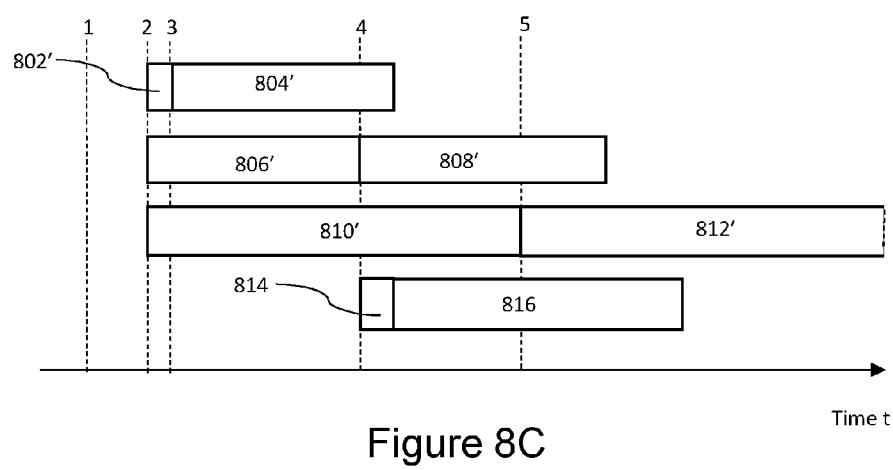
FIG. 8c is a diagram illustrating an exemplary control schedule generated according to an embodiment of the present invention.

In scenario C of FIG. 8a, the same monitored frequency changes, initiation of the control period, determination of frequency characteristics, and generation of the control instructions occur as in scenario B, and the same initial control schedule of FIG. 8b is generated and executed as shown by the first three rows of control blocks in FIG. 8c. In scenario C however, the control of the power units of block 804' does not prevent the monitored frequency from continuing to fall after 3. The CN 130, however continues to monitor the grid frequency after the control instructions are generated and sent at 2, and determines during the interval between 2 and 4 that, for example from an analysis of the frequency characteristics derived during this period, one or more further conditions have been met, for example, that the monitored frequency is still falling, and that further control instructions need to be generated and sent. The processor 304 of the CN 130 may, therefore, calculate the additional power consumption and/or provision control necessary to compensate for the fall in frequency determined between 2 and 4. The processor 304 of the CN 130 may then further retrieve profile information of the distributed plurality of power units connected to the grid 100, further filter and select power units for use in the further control, and generate further control instructions to effect the compensation further calculated as necessary. These control instructions are sent at 5 to the group represented in the exemplary control schedule of FIG. 8c as block 816. There may be a short time interval for the power units to respond to the control instructions represented by block 814.

The additional response provided by the control of the power units of block 816 is reflected in the exemplary plot of monitored frequency in scenario C in FIG. 8a, as, in the interval between 4 and 5, the frequency ceases to fall, and begins to rise. In scenario C, the additional contribution of the power units of block 816 ceases shortly after 5, but the commencement of the response from the power units of block 812' at 5 is sufficient to return the monitored frequency to the near the nominal value. The control period in scenario C may be ceased and restarted in the same way as described above in scenario B.

In such a way, power units may be aggregated and controlled to provide a dynamic, well defined, and continuing response to a change in grid frequency to restore a grid frequency to a nominal value.

The generation of the control instructions may be restricted such that the combined power provision and/or consumption produced from controlling the power units in the control period conforms to a predefined temporal profile. This profile may, for example, be predefined by a grid operator in order to limit the damage done to electrical devices that could be caused, for example, by a response that is too rapid.

Parameters defining a predefined temporal profile may be defined by a system operator as, for example, static parameters. The parameters and/or temporal profile may be specific to local areas or regions of the grid, be defined only to be valid for a specific time window, for example at certain times during a day or week, and may also be flexible for a given determination of frequency characteristic, for example be less restrictive in response to a determination of a certain level of severity of a monitored frequency change.

The control instructions to produce a predefined temporal profile may be generated, for example, in advance of any conditions related to the monitored frequency being met. For example, the step 510 in FIG. 5 of generating control instructions may comprise, for example, retrieving a set of predefined control instructions for a predefined set of power units from a data store, for example, data store 306 of the CN 130.

The set of pre-generated control instructions when sent may, for example, give rise to the predefined temporal response. There may be different sets of pre-generated control instructions which account for different predefined temporal profiles, the temporal profiles for example being defined by one or more parameters as described above.

A particular set of pre-generated control instructions may be retrieved on the basis of one or more variation characteristics. For example, using methods described in detail above with respect to FIGS. 5 to 8c, it may be determined that a variation characteristic indicates that the frequency change event in a certain location is classed as 'high severity'. In this case, for example, a set of control instructions that have been pre-generated to provide a response to a 'high severity' event in that location may, for example, be retrieved from the data store 306 of the CN 130, and sent to the PUCs 118 defined therein.

Frequency variation may, for example, be given a numerical grading based on determined variation characteristics and, for example, grid inertia at the time and/or location at which the variation was measured. For example, a variation that is or is predicted to be likely to give rise to a relatively fast reduction in grid frequency or a reduction of a relatively large magnitude or a combination of both may be graded with, say, '40', whereas a variation with a relatively slow increase or of a relatively small magnitude or both may be graded with, say, '+2'. There may be, say, 20 different pre-generated sets of control instructions (i.e. −10 to −1 and +1 to +10), each defined to produce, when sent, a response that is proportionate to a determined severity variation grade. For example, if a variation has variation characteristics which fall into, say, grade '−7', the corresponding pre-generated control instructions labelled '−7' which have been pre-generated to provide a proportionate response for a frequency variation of grade '−7' may be retrieved and sent. This may allow for a faster response since there is reduced level of calculation, at or after the initiation of the control period, of which power units to include in the response and what control instructions they should be sent in order to produce a sufficient response.

It may be, for example, that a pre-generated set of control instructions is sent to the power units defined therein as an initial response to a determined change in variation characteristic, before further control instructions are generated and sent based on subsequent monitoring of the grid frequency. For example, the control instructions sent to the groups represented by blocks 804', 808' and 812' in FIG. 8c may be pre-generated and retrieved between 2 and 3 in response to the monitored frequency change between 1 and 2. Control instructions may then be generated and sent to the group of power units represented by block 816 in FIG. 8c at point 4 in response to a subsequent monitoring of grid frequency.

The generation of the control instructions may also incorporate information relating to the grid inertia at a specific location in the grid at a specific time. For example, if at a specific time, a specific grid location has, say, a low inertia, in response to a significant frequency change, control instructions may be generated so as to control power units to provide, as close as possible, an appropriately rapid response, for example by selecting power units able to provide the fastest responses. If it is determined, however, that an area of the grid at a certain time has, say, high inertia, it may be taken into account in the generation of the control instructions that generating control instructions for fast responding power units is of a lower importance.

To increase the precision and level of control of the coordinated response, in addition to the processor 304 of the CN 130 using a characterizing response time associated with power units in the generation of the control instructions, or otherwise, the processor 304 may also use a characterizing response function of the power units which may further form part of the profile information. A characterizing response function, as well as simply relating to a characterizing response time as shown, for example, for the power units of block 804 of FIG. 8*b* by block 802, relates to the functional form of the change in power consumption and/or provision of a power unit in response to receiving a given control instruction. For example, the block 802 of FIG. 8*b* represents a time after which power units of block 804 can provide a given level of provision in response to receiving the control instruction. However, in some embodiments, the block 802 may represent some function of time which characterizes the way in which power is provided by the power units before the provision of power as specified in the control instructions is achieved. Alternatively the characterizing response function may be represented by parameters characterizing a parameterized functional form. For example, a mechanical generator's power provision may be characterized initially by a run-up period, which may be characterized, for example, by a parameterized function P(t)=A−BeCt, where P(t) is the power output at time t, and A, B, and C are parameters characterizing the function. In another example, a diesel generator may initially consume power by use of a starter motor before it provides electrical power, and so may be characterized by a different functional form. In another example, a slow control circuitry may result in a period of zero power output from a power unit, and hence the characterizing response function may reflect this by, for example parameterizing an offset in time. The characterizing response function may also represent a measured or appropriated response comprising representative data points of the response of a power unit, and therefore need not necessarily be characterized by a functional form or parameters associated therewith.

The control instructions generated and sent to a group of power units, for example those represented by block 804 in FIG. 8*b*, may comprise instructions to turn off, turn on, increase or decrease power provision, increase or decrease power consumption, change power provision and/or consumption for a certain time, and change power provision and/or consumption according to a specified time profile. In order to achieve a predefined temporal profile of the overall response with a high precision, the control instructions of block 804 may include instructions to increase power provision according to a parameterized function, for example, according to P(t)=A−BeCt, where P(t) is the power output at time t, and A, B, and C are parameters characterizing the function. The control instructions may, for example, only include the parameters of a function, or an identifier of a predefined functional form known both to the CN 130 and the PUC 118. It will be appreciated that other functional forms may be defined and parameterized as necessary to produce a desired temporal response of power provision and/or consumption of a power unit.

In some embodiments, the processing means of the control system may comprise a distributed plurality of processors, for example, comprising processors from one or more CNs, one or more PUCs, and one or more measurement devices 120. Any of the abovementioned calculations, determinations, derivations, or any other such action carried out by any of the processors described above may be implemented by any one of, or using any combination of, processors of the various embodiments described herein. As an example, the monitoring of the grid frequency, for example as represented by step 502 of FIG. 5, and the determination that a condition relating to the monitored frequency has been met, for example as represented by step 504 in FIG. 5, may be achieved using a processor of the measurement device at which the frequency is being measured. The measurement device may then communicate details of the condition being met to the CN 130, and the processor 304 and communication means I/O 302 of the CN 130 may then undertake the steps represented by 506 to 512 of FIG. 5. In a further example, the processor of a measurement device may initiate a control period, for example as represented by step 506 of FIG. 5, and communicate details of the control period to a CN 130. The distribution of the processing functions may reduce the requirements on the processors of the CNs and hence save cost of these elements. The distribution of processing functionality may also allow load balancing between different processors to get the most efficient use of the processors of the system, and also to avoid overloading of any processors and the associated delay in response that this would produce.

It will be understood that any exemplary embodiment described above concerning control of power units in response to a certain reduction in grid frequency may apply equally to the control of power units in response to a certain increase in grid frequency. For example, it may be that there is a sudden decrease in demand, for example, due to a sudden correlated decrease in power consumption of street lights which are set to a timer. There may also be a, perhaps sudden, increase in supply due to, for example, a mismanagement or erroneous control of a generator or group of generators, or, for example, an exceptionally sunny and windy period which allows many wind farms and solar panels to provide power to the grid at high capacity. In these cases, there may be more supply than demand of electrical power which may lead to a, perhaps sudden, increase in grid frequency. This increase of frequency may put, or be determined likely to put, the grid frequency outside a desired range of frequencies about the nominal grid frequency, and so the control system, as described in detail above with reference to exemplary embodiments, may act so as to return the monitored frequency to at or close to its nominal value. In the same way as described in detail above, this may involve sending control instructions power units which provide electrical power to cease or reduce their provision, and/or sending control instructions to power units which consume electrical power to maintain or increase their consumption. In any case, as described in detail above, the control instructions are generated on the basis of the profile information of the power units, and on the basis of determined variation characteristics. It will therefore be readily appreciated that embodiments of the present invention may be applied to variations of grid frequency both increasing and decreasing in nature.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A control system for use in an electric power grid, electricity flowing in the grid in accordance with a grid frequency, wherein the electric power grid is connected to one or more of a distributed plurality of power units each arranged to consume electric power from or provide electric power to the electric power grid such that a change in power provision or consumption by a said power unit results in a change in power flow in the electric power grid, thereby changing a contribution of the power unit to the grid frequency, the control system comprising:
- at least one processor;
- at least one memory including computer program code; and
- a communication unit,
  - the at least one memory and the computer program code being configured to, with the at least one processor, cause the control system at least to:
    - monitor a grid frequency at one or more predefined locations in the electric power grid;
    - determine that one or more conditions relating to the monitored frequency have been met;
    - initiate, based on the determination, a control period during which the grid frequency at one or more of the one or more predefined locations is to be controlled;
    - determine, based on the monitoring, one or more variation characteristics of a variation, during said control period, in the grid frequency;
    - send, via the communications unit, control instructions to a first plurality of the distributed plurality of power units, the control instructions comprising instructions to control power flow to or from each of the first plurality of power units so as to control the monitored frequency,
  - wherein the control instructions are generated on the basis of:
  - profile information relating to the distributed plurality of power units, the profile information including information relating to one or more power consumption or provision characteristics of the first plurality of power units; and
  - the determined one or more variation characteristics of the variation in the grid frequency,
  - such that the first plurality of power units provides a time-varying contribution to the grid frequency during said period;

wherein the one or more variation characteristics are determined on the basis of a forecast of a variation in grid frequency, wherein the forecast of the variation in grid frequency comprises: defining a series of values associated with at least one frequency characteristic, and determining a non-linear function on the basis of the series of values associated with the at least one frequency characteristic.

2. The control system of claim 1, wherein the first plurality is selected from the distributed plurality on the basis of the profile information.

3. The control system of claim 2, wherein the selection of power units to include in the first plurality is made in response to the determination that the one or more conditions relating to the monitored frequency have been met.

4. The control system of claim 1, comprising a data store storing the profile information.

5. The control system of claim 4, wherein the data store is arranged to store profile information relating to one or more power consumption or provision characteristics of one or more groups of power units, wherein the groups are formed from at least some of the first plurality of distributed power units.

6. The control system of claim 5, wherein the one or more groups of power units consist of power units with one or more of a common or similar power class, response time characteristic, grid location and geographical location.

7. The control system of claim 1, wherein the one or more power consumption or provision characteristics relate to one or more of a provision capacity, a consumption capacity, a characterizing response time, a characterizing response function, a provision or consumption status, and an availability status.

8. The control system of claim 1, wherein the control system comprises one or more measurement devices for performing one or more measurements relating to grid frequency, and wherein the determined one or more variation characteristics are derived from the one or more measurements.

9. The control system of claim 1, wherein the control system is arranged to receive from, one or more remote measurement devices, one or more indications that the one or more conditions relating to the monitored frequency have been met, and the determination that one or more conditions relating to the monitored frequency have been met is based at least partly on the condition.

10. The control system of claim 1, wherein the determination that the one or more conditions have been met comprises comparing one or more values associated with the monitored frequency to one or more thresholds.

11. The control system of claim 10, wherein the determination comprises evaluating whether the one or more values lie within one or more ranges, wherein each of the one or more ranges is defined as lying between two of the thresholds, and wherein the one or more conditions are met when one or more of the one or more values lie outside one or more of the one or more ranges.

12. The control system of claim 10, wherein one of the one or more values relate to a forecasted value of grid frequency.

13. The control system of claim 12, wherein the forecasted value is generated on the basis of forecasting procedure, the procedure comprising:
- defining a series of values associated with the monitored frequency, and
- determining a polynomial function on the basis of the series of values associated with the monitored frequency.

14. The control system of claim 1, wherein the at least one memory and the computer program code are configured to, with the at least one processor, cause the control system to:
- define a first series of values associated with a first frequency characteristic during a first time period and a second series of values associated with the first frequency characteristic during a second, later, time period;
- determine a first polynomial function having a first set of coefficients on the basis of said first series of values and a second polynomial function having a second set of coefficients on the basis of said second series of values.

15. The control system of claim 14, wherein the control instructions are generated on the basis of a difference between the first set of coefficients and the second set of coefficients.

16. The control system of claim 15, wherein the determination that the one or more conditions have been met comprises evaluating a difference between the first set of coefficients and the second set of coefficients.

17. The control system of claim 16, wherein the determination that the one or more conditions have been met further comprises a determination that a difference between one of the coefficients of the first set of coefficients and one of the coefficients of the second set of coefficients is below or above a predetermined threshold or within a predetermined range.

18. The control system of claim 1, wherein the frequency characteristic is related to one or more of a frequency of alternating voltage, a frequency of alternating current, a frequency of power flowing in the electric power grid; a rate of change of frequency; and a period of alternating current.

19. The control system of claim 1, wherein sending the control instructions comprises:
sending a first set of one or more control instructions, and
sending, subsequent to sending the first set of one or more control instructions, one or more further sets of one or more control instructions.

20. The control system of claim 19, wherein at least one of the one or more further sets of one or more control instructions is generated in response to a determination, based on a monitoring, subsequent to the sending of the first set of one or more control instructions, of the grid frequency, that one or more further conditions have been met.

21. The control system of claim 20, wherein the one or more further conditions comprise that one or more values relating to the monitored frequency characteristic are below or above a predetermined threshold or within a predetermined range of values.

22. The control system of claim 19, wherein at least one of the further sets of one or more control instructions are sent to a second plurality of the distributed plurality of power units, wherein the second plurality is different from the first plurality.

23. The control system of claim 1, the at least one memory and the computer program code are configured to, with the at least one processor, cause the control system to generate a control schedule on the basis of the profile information and send the control instructions on the basis of the control schedule, the control schedule specifying one or more times at which to control power flow to or from the first plurality of power units.

24. The control system of claim 23, wherein the control schedule is generated according to a desired temporal profile of the monitored grid frequency.

25. The control system of claim 1, wherein the control instructions comprise one or more of: instructions to turn off, turn on, increase or decrease power provision, increase or decrease power consumption, change power provision or consumption for a certain time, change power provision or consumption according to a specified time profile.

26. A control system according to claim 1, wherein the non-linear function is a polynomial function, an exponential function, a power function, or a conic function.

27. A method according to claim 25, wherein the non-linear function is a polynomial function, an exponential function, a power function, or a conic function.

28. A method of controlling frequency of electricity in an electric power grid, electricity flowing in the grid in accordance with a grid frequency, wherein the electric power grid is connected to one or more of a distributed plurality of power units each arranged to consume electric power from or provide electric power to the electric power grid such that a change in power provision or consumption by a said power unit results in a change in power flow in the electric power grid, thereby changing a contribution of the power unit to the grid frequency, the method comprising:
monitoring a grid frequency at one or more predefined locations in the electric power grid;
determining that one or more conditions relating to the monitored frequency have been met;
initiating, based on the determination, a control period during which the grid frequency at one or more of the one or more predefined locations is to be controlled;
determining, based on the monitoring, one or more variation characteristics of a variation, during said control period, in the grid frequency;
sending control instructions to a first plurality of the distributed plurality of power units, the control instructions comprising instructions to control power flow to or from each of the first plurality of power units so as to control the monitored frequency,
wherein the control instructions are generated on the basis of:
profile information relating to the distributed plurality of power units, the profile information including information relating to one or more power consumption or provision characteristics of the first plurality of power units; and
the determined one or more variation characteristics of the variation in the grid frequency, such that the first plurality of power units provides a time-varying contribution to the grid frequency during said period;
wherein the one or more variation characteristics are determined on the basis of a forecast of a variation in grid frequency, wherein the forecast of the variation in grid frequency comprises: defining a series of values associated with at least one frequency characteristic, and determining a non-linear function on the basis of the series of values associated with the at least one frequency characteristic.

29. A non-transitory computer readable storage medium comprising a set of computer-readable instructions stored thereon which, when executed by a processing system, cause the processing system to perform a method of controlling frequency of electricity in an electric power grid, electricity flowing in the grid in accordance with a grid frequency, wherein the electric power grid is connected to one or more of a distributed plurality of power units each arranged to consume electric power from or provide electric power to the electric power grid such that a change in power provision or consumption by a said power unit results in a change in power flow in the electric power grid, thereby changing a contribution of the power unit to the grid frequency, the method comprising:
monitoring a grid frequency at one or more predefined locations in the electric power grid;
determining that one or more conditions relating to the monitored frequency have been met;
initiating, based on the determination, a control period during which the grid frequency at one or more of the one or more predefined locations is to be controlled;
determining, based on the monitoring, one or more variation characteristics of a variation, during said control period, in grid frequency;
sending control instructions to a first plurality of the distributed plurality of power units, the control instructions comprising instructions to control power flow to or from each of the first plurality of power units so as to control the monitored frequency,
wherein the control instructions are generated on the basis of:
profile information relating to the distributed plurality of power units, the profile information including information relating to one or more power consumption or provision characteristics of the first plurality of power units; and
the determined one or more variation characteristics of the variation in the grid frequency, such that the first plurality of power units provides a time-varying contribution to the grid frequency during said period;

wherein the one or more variation characteristics are determined on the basis of a forecast of a variation in grid frequency, wherein the forecast of the variation in grid frequency comprises: defining a series of values associated with at least one frequency characteristic, and determining a non-linear function on the basis of the series of values associated with the at least one frequency characteristic.

\* \* \* \* \*